No. 778,394. PATENTED DEC. 27, 1904.
P. N. ANGSTEN & C. H. GESBECK.
PANORAMIC CAMERA.
APPLICATION FILED MAY 31, 1898.

3 SHEETS—SHEET 1.

Witnesses:
Geo. W. Young.
Chas. L. Goss.

Inventors:
Peter N. Angsten,
Charles H. Gesbeck,

Attorneys.

No. 778,394. PATENTED DEC. 27, 1904.
P. N. ANGSTEN & C. H. GESBECK.
PANORAMIC CAMERA.
APPLICATION FILED MAY 31, 1898.
3 SHEETS—SHEET 2.
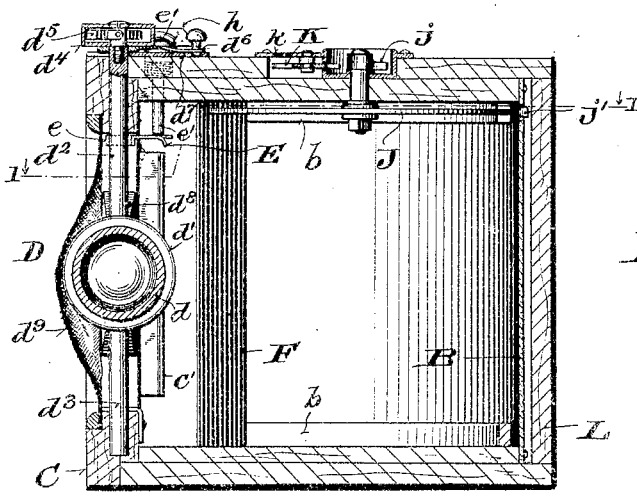
Fig. 2.
Fig. 3.
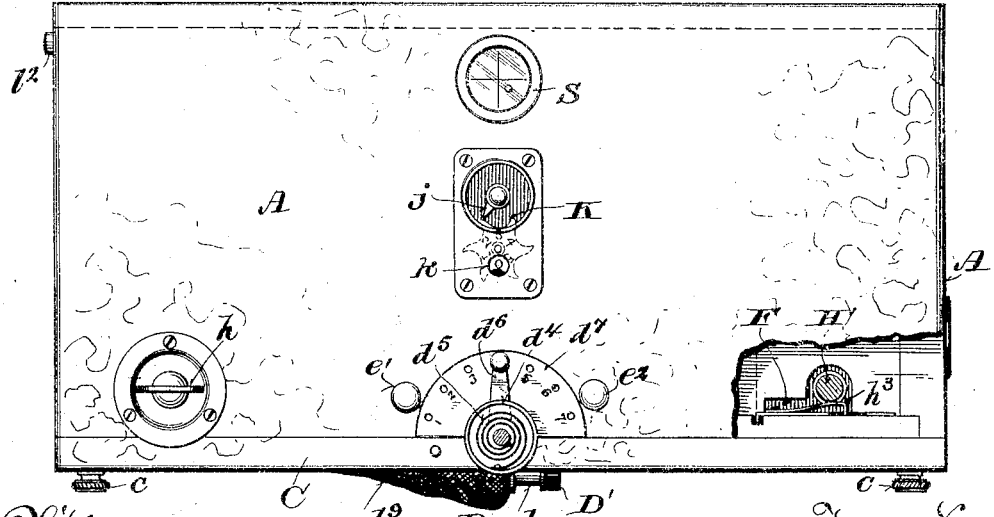
Witnesses:
Geo. W. Young
Chas. L. Foss
Inventors:
Peter N. Angsten,
Charles H. Gesbeck, No. 778,394. PATENTED DEC. 27, 1904.
P. N. ANGSTEN & C. H. GESBECK.
PANORAMIC CAMERA.
APPLICATION FILED MAY 31, 1898.
3 SHEETS—SHEET 3.
Fig. 4.
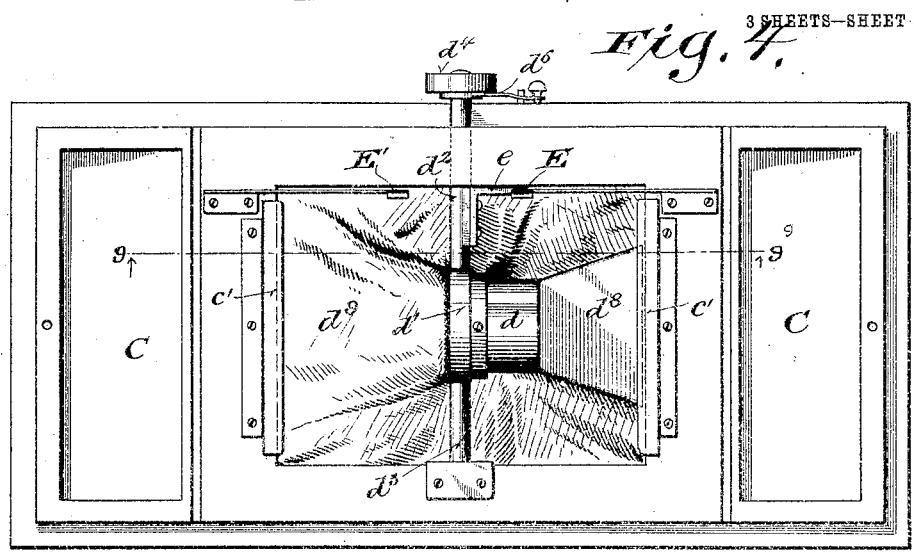
Fig. 5. Fig. 6. Fig. 7.
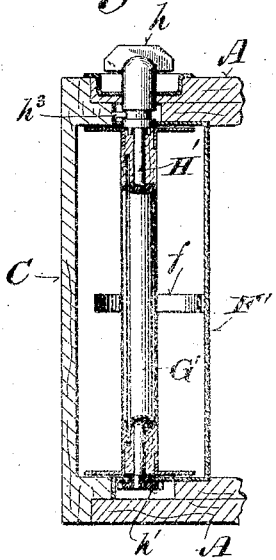 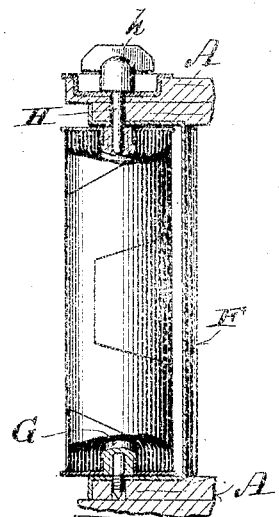 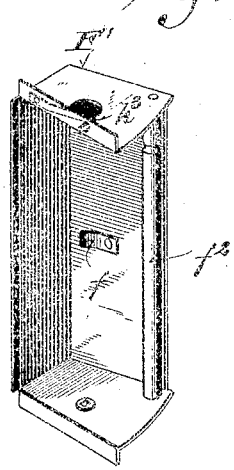
Fig. 8.
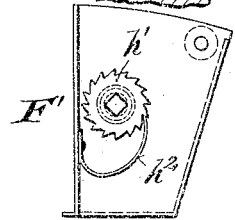
Witnesses:
Geo. W. Young,
Chas. L. Ross.
Inventors:
Peter N. Angsten,
Charles H. Gesbeck,
By Winkler, Flanders, Smith, Bottum & Vilas,
Attorneys.

No. 778,394. Patented December 27, 1904.

UNITED STATES PATENT OFFICE.

PETER N. ANGSTEN AND CHARLES H. GESBECK, OF CHICAGO, ILLINOIS, ASSIGNORS TO MULTISCOPE AND FILM COMPANY, OF BURLINGTON, WISCONSIN, A CORPORATION OF WISCONSIN.

PANORAMIC CAMERA.

SPECIFICATION forming part of Letters Patent No. 778,394, dated December 27, 1904.

Application filed May 31, 1898. Serial No. 682,092.

*To all whom it may concern:*

Be it known that we, PETER N. ANGSTEN and CHARLES H. GESBECK, citizens of the United States, residing at Chicago, in the county of Cook and State of Illinois, have invented certain new and useful Improvements in Panoramic Cameras, of which the following is a specification, reference being had to the accompanying drawings, forming a part thereof.

This invention relates to panoramic cameras in which the lenses are arranged to sweep the horizon, and thus extend the range of exposure horizontally. Its main objects are to provide an instrument of compact and convenient form and arrangement for taking panoramic pictures and to simplify and improve the construction and operation of devices of this class.

It consists in certain novel features of construction and in the combinations of parts hereinafter particularly described, and pointed out in the claims.

In the accompanying drawings like letters designate the same parts in the several figures.

Figure 1:
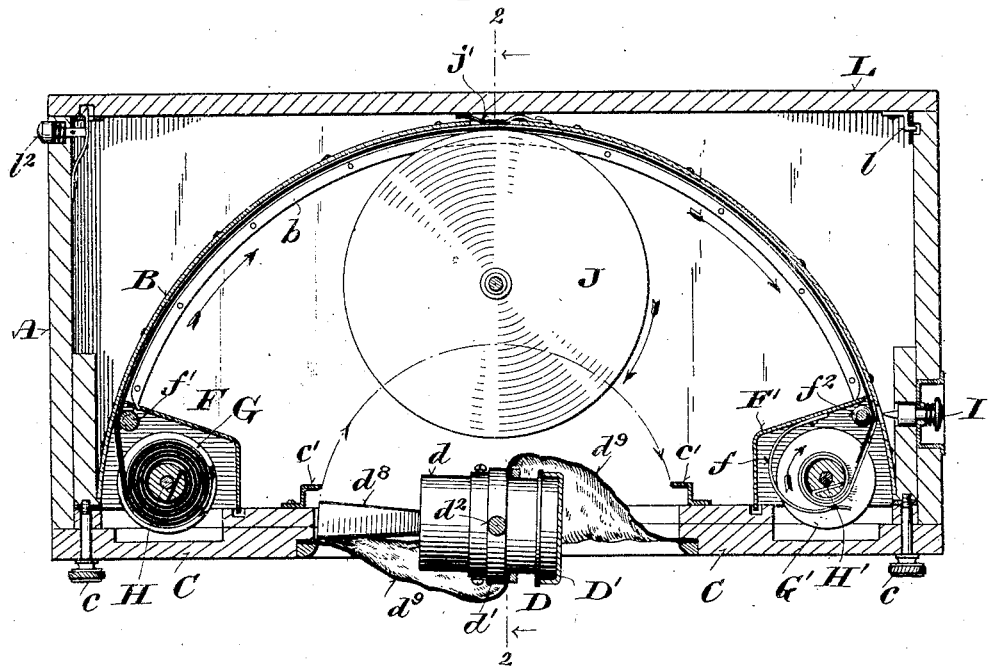
Figure 2:
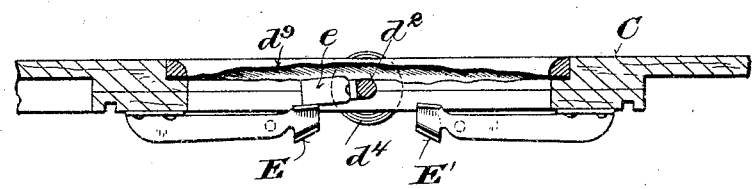

Figure 1 is a horizontal section on the line 1 1, Fig. 2, of a camera embodying our invention. Fig. 2 is a vertical section thereof on the line 2 2, Fig. 1. Fig. 3 is a plan view of the camera, parts being broken away and shown in section. Fig. 4 is an inside elevation of the removable front board and lens-holder. Figs. 5 and 6 are vertical sections of the receiving and delivering film-holders, respectively. Fig. 7 is a perspective view of the case of the receiving-holder. Fig. 8 is a lower end view of the receiving-holder; and Fig. 9 is a horizontal section on the line 9 9, Fig. 4, and an inverted plan view of the catches for holding the lens-holder in place at the limits of its movement.

A designates the case of the camera, which may be made of any suitable size, shape, and material. It is provided with a semicircular or curved film-supporting back B, which extends from end to end of the case.

$b\ b$ are curved cleats attached to the top and bottom of the case on the concave side of and concentric with the back B. They serve by engagement with the edges of the film to hold and guide it close to the back B in a semicircular or semicylindrical form.

C is a removable front board or lens-frame fitted to the case A on the concave side of the back B. It is secured in place by thumb-screws $c\ c$, as shown in Figs. 1 and 3.

In a rectangular opening in the board or frame C is mounted the horizontally-swinging lens-holder D. This consists of a horizontally-disposed tube or barrel $d$, held in a ring $d'$, which is provided on opposite sides with vertical spindles $d^2$ and $d^3$, as shown in Figs. 2 and 4. These spindles are journaled in the frame C above and below the opening therein, and the spindle $d^2$ is provided at its upper end with a spring-case $d^4$, loosely mounted thereon and connected therewith by a coiled spring $d^5$, as shown in Fig. 3. This spring tends to turn the lens-holder from left to right, as indicated by the dotted line and arrows in Fig. 1, and said spring-case is provided with an arm $d^6$, which has a pin on the under side arranged to engage with any one of a series of holes in a plate $d^7$, which is attached to the top of the case A, as shown in Figs. 2, 3, and 4. By means of this arm and plate the tension of the spring may be easily adjusted to produce a more or less rapid movement of the lens and to thus regulate the duration of the exposure as desired. The spring-case $d^4$ may, however, be omitted, and in place of the coiled spring $d^5$ a spiral or helical spring attached at one end to the spindle $d^2$ and at the other directly to the arm $d^6$ may be substituted.

To the inner end of the barrel $d$ of the lens-holder is attached the smaller end of a vertically-elongated funnel-shaped shield $d^8$, by which the rays of light passing through the lens are concentrated horizontally upon the film and an exposure of uniform intensity is insured. The outer end of said barrel is provided with a detachable cap D'. The opening in the frame C around the lens-barrel $d$ is closed by a filling $d^9$, of leather or other suitable flexible material, which excludes light and permits the free movement of the lens-holder.

E E' are spring-catches attached to the inside of the frame C and adapted to automatically engage with an arm or projection $e$ on the spindle $d^2$ of the lens-holder and arrest and retain it in either one of its extreme positions.

$e'$ and $e^2$ are spring-retracted push-buttons passing through the top of case A in position to press said catches out of engagement with the arm $e$, and thus release the lens-holder.

To the lens-frame C on each side of the opening therein are attached inwardly-projecting screens $c'$ $c'$, the inner edges of which are placed close to the path of the inner end of the shield $d^8$. These screens serve to intercept any light-rays that might enter the camera through said shield, and thus prevent injury to the film when the lens-holder is standing in either extreme position and the cap D' is removed.

F F' are cases inclosing the spools G G', on which the film is wound and constituting, with said spools, the film-holders. The spools G G' are held upon removable spindles H H', passing vertically through the top of case A and the ends of the cases F and F', as shown in Figs. 5 and 6. The cases F and F' may be conveniently made of sheet metal closed on two sides and at both ends, as shown in Fig. 7, one of the remaining sides of each being closed by the curved back B and the other by the frame C, as shown in Fig. 1. Access is had to the film-cases for removing the spools and reloading the camera by removing the frame C.

The spindles H H' are provided at their upper ends with heads $h$ $h$, by means of which they are turned and are withdrawn from and inserted in the film-cases and spools when the camera is reloaded. The spindle H, upon which the spool G turns, may be threaded at its lower end in the lower end of the case F, as shown in Fig. 6, or it may be made plain and loosely inserted therein.

The case F' is provided with a spring $f$, which is constructed and arranged to press against the film and cause it to wind closely upon the spool G', as shown in Fig. 1.

The spindle H' is squared at its lower end to fit a corresponding hole in a ratchet-wheel $h'$, which is journaled in the lower end of the case F', as shown in Figs. 5 and 8. This ratchet-wheel is engaged by a yielding detent $h^2$, which prevents it, and consequently the spool G', from turning backward and unwinding that portion of the film which has been exposed.

The spindle H' is held in place in the case F' and the spool G' by a spring-catch $h^3$, which is attached to a flange on the upper end of the case F', as shown in Fig. 7, and is pressed and held by the frame C in engagement with a groove in the head of said spindle, as shown in Figs. 3 and 5.

The spool G' is engaged, as shown in Fig. 5, by pins or projections on the head of spindle H', and thus caused to turn therewith, so that by turning said spindle the film is wound from the spool G upon the spool G'.

The film-cases are provided, as shown in Figs. 1 and 7, with rollers $f'$ and $f^2$, by which the film as it passes from the spool G to the spool G' is guided and held in its proper relation to the curved back B and cleats $b$. The roller $f^2$ is formed with a groove opposite a hole in the back B and the point of a spring-retracted punch I, which is fitted in the end of case A, as shown in Fig. 1. Before or after each exposure this punch is thrust inward, perforating the film, and thus indicating the points where it is to be severed between the different exposures.

J is a wheel the spindle of which is journaled in the top of case A and provided with an index $j$, as shown in Fig. 2. The film is yieldingly pressed and held by a spring $j'$ against the periphery of said wheel, which is arranged to run close to the concave side of the back B, as shown in Fig. 1. As the film is wound from the spool G upon the spool G' it turns this wheel, one revolution of which, noted by means of the index $j$, determines the proper length of film for one exposure or picture.

K is a toothed wheel journaled in the top of case A in position to be actuated by the index $j$. It is provided on its upper face with a circular series of figures corresponding with the number of its teeth, one of the figures of the series being exposed through an opening $k$ in the case or plate, which incloses or covers said wheel, as shown in Figs. 2 and 3. Each revolution of the index-wheel J turns the register-wheel K an interval corresponding with the distance between adjoining teeth, thus bringing another number into view. The number of pictures or exposures made is thus automatically registered.

The case A is provided with a detachable back L, which is secured thereto by suitable fastenings $l$ and $l^2$.

A level S may be provided in the top of case A to facilitate the proper setting and adjustment of the instrument.

The operation of and manner of using the camera may be described briefly as follows: The instrument having been properly adjusted, a sufficient length of unused film unwound from the spool G, as hereinbefore explained, and the lens-holders being held by the catch E in the position shown in Fig. 1, the cap D' is removed and the button $e'$ pressed, thereby disengaging the catch E and releasing the lens-holder, which is turned with more or less rapidity by the spring $d^5$ into its other extreme position, where it is caught and held by the catch E', which prevents the recoil of the inner end of the shield $d^8$ from behind the adjacent screen $c'$ and consequent fogging of the film. The cap D' is then replaced, the lens-holder D turned back to its initial position, where it is caught and held by the catch E, and the exposure just made is wound upon the spool G', thus unwinding from the spool G and drawing out in front of the back B another length of film sufficient for the next exposure, a hole being made in the film by the punch I after each exposure. To reload the camera, the exposed film is wound completely on the spool G'. The frame C is detached and removed from the case A, thus exposing the spools, which are both removed after withdrawing the spindles H H'. Another spool, G, upon which an unused film is wound, is then placed in the case F and an empty spool G' in the case F'. The outer end of the film or of its wrapper is detached and carried around the back B and tucked through the slot in the spool G'. The frame C is now replaced and secured to the case A, and the instrument is ready for use after unwinding enough film for the first exposure.

Various changes in minor details of construction may be made within the spirit and intended scope of our invention.

We claim—

1. In a panoramic camera the combination with a suitable case having a curved film-support, of a rotary lens-holder arranged concentrically with said film-support, a spring tending to turn said lens-holder in one direction and to hold it in its final position, two catches each adapted to automatically engage and to retain said lens-holder in one of its extreme positions and means for manually releasing said catches, substantially as described.

2. In a panoramic camera the combination with a suitable case having a curved film-support, of a horizontally-swinging lens-holder, a spring attached at one end to the lens-holder and tending to turn it from one limit of its movement to the other, a pivoted arm attached to the other end of said spring and means for locking said arm in different positions, substantially as described.

3. In a panoramic camera the combination with a suitable case having a curved film-support, of a rotary lens-holder provided on opposite sides with spindles which are journaled in said case, an arm loosely mounted upon one of said spindles and connected therewith by a spring which tends to turn the lens-holder from one limit of its movement to the other and means for holding said arm in different positions, whereby the tension of the spring is adjusted and the time of exposure is varied, substantially as described.

4. In a panoramic camera the combination with a suitable case having a curved film-support and an opening in the front board, of a horizontally-swinging lens-holder provided on opposite sides with vertical spindles which are journaled in said front board and at its inner end with a vertically-elongated funnel-shaped shield for concentrating light-rays horizontally upon the film, a flexible connection between the lens-holder and case closing the opening in the front board against admission of light, a spring tending to turn the lens-holder from one extreme position to the other, two automatic catches each adapted to engage and to retain the lens-holder in one of its extreme positions, means for manually disengaging said catches and screens projecting inwardly from the front board in position to intercept light entering the camera through the shield of the lens-holder, substantially as described.

5. In a panoramic camera the combination with a case having a curved film-supporting back and a removable front board or lens-frame, of a horizontally-swinging lens-holder mounted in said frame concentrically with the curved film-back, two spring-catches each adapted to engage and retain said lens-holder in one of its extreme positions, and push-buttons for manually disengaging said catches and releasing the lens-holder, substantially as described.

6. In a panoramic camera the combination with a case having a curved film-supporting back and a guide, of an index-wheel journaled in said case in position to bear at its periphery against the concave side of the film at or near one edge thereof only and constructed and arranged to indicate to the operator the extent of movement of the film, and a spring adapted to yieldingly press the film against the periphery of said index-wheel, substantially as described.

7. In a panoramic camera the combination with a case having a curved film-supporting back and provided with spools from and upon which the film is wound at the ends of the back, of an index-wheel journaled in said case between said spools in position to bear at its periphery against the film at or near one edge thereof only and provided with an index exposed to view for determining the extent of movement of the film, and a spring adapted to yieldingly press the film against the periphery of said index-wheel, substantially as described.

8. In a panoramic camera the combination with a case having a curved film supporting and guiding back and provided with spool-cases at the ends of said back, of an index-wheel journaled in said case between said spool-cases in position to bear at its periphery against the concave side of the film at or near one edge thereof only, a spring adapted to yieldingly press the film against the periphery of said index-wheel, and a registering-wheel adapted to be turned by the index-wheel and provided with a scale or circular series of numbers which are exposed in succession through an opening in the camera-case, substantially as described.

9. In a panoramic camera the combination with a case having a curved film-supporting back and guide, of film-cases at the ends of said guide provided with vertically-disposed guiding-rollers for directing the film as it is wound from one spool upon the other to and from said curved back and guide, and a removable front board or lens-frame provided with a horizontally-swinging lens-holder and serving when in place to close said film-cases and when removed to open them for reloading the camera, substantially as described.

10. In a panoramic camera the combination with a case having a curved film-supporting back and guide, of film-cases located at the ends of said back and open in front, a removable front board or lens-frame provided with a horizontally-swinging lens-holder and adapted when in place to close said film-cases, spool-spindles passing vertically through said film-cases and removable therefrom, the spindle of the winding-spool being squared at its lower end and formed with a circumferential groove at its upper end, a ratchet-wheel journaled in the lower end of one of the film-cases and formed with a squared hole to receive the squared end of the winding-spindle, a detent engaging with and preventing reverse rotation of said ratchet-wheel, and a spring-catch arranged to be pressed into and held in the groove in the upper end of the winding-spindle by the front board when the latter is replaced after loading the camera, substantially as described.

11. In a panoramic camera the combination with a case having a curved film-supporting back and film-cases located at the ends of the back, of removable spool-spindles which pass through and are supported in the ends of said cases, one of said spindles being provided with means for turning it and means for preventing its reverse rotation, and the other film-case being provided with a spring adapted to press against the film as it is wound upon the spool, and a removable front board or lens-frame forming a closure for the film-cases and affording access thereto for loading the camera, substantially as described.

12. In a panoramic camera the combination with a suitable case having a curved film-supporting back and guide, of spools arranged at the ends of said back for holding the film, film-guiding rollers for holding the film close to said back as it passes to and from said spools, one of said rollers being formed with a circumferential groove and a punch projecting through said case with its point opposite the groove in said roller, substantially as described.

In witness whereof we hereto affix our signatures in presence of two witnesses.

PETER N. ANGSTEN.
CHARLES H. GESBECK.

Witnesses:
JNO. REYNOLDS,
L. J. SMITH.